Patented Oct. 8, 1929

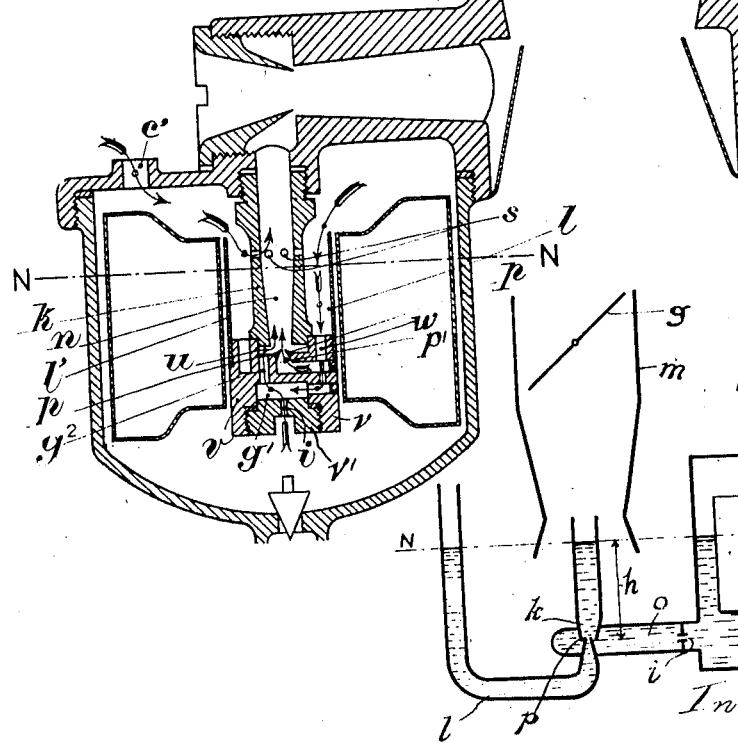

1,731,123

UNITED STATES PATENT OFFICE

GEORGES FÉLIX BRUT, OF LYON, FRANCE

CARBURETOR FOR EXPLOSION ENGINES

Application filed February 14, 1922, Serial No. 536,485, and in France February 17, 1921.

This invention relates to improvements in carburetors for supplying combustible mixture to explosion engines and has for its object the improvement in the construction of carburetors of this type, which consists in providing a submersible nozzle in the form of a venturi of such construction that air drawn in by the suction of the engine produces on said nozzle a positive and regular action instead of the uneven and irregular action produced by the usual type of submerged nozzle carburetors.

The invention is illustrated in the annexed drawings in which:

Fig. 1 is a diagram illustrating the principle of the invention while

Figs. 2 and 3 are modified forms of practical embodiments for carrying out the invention, Figure 2 being a vertical section through a carburetor in which the float chamber is to one side of the carbureting element while Figure 3 is a similar view in which the carbureting element is within and is itself concentric to the float chamber.

Referring now in detail to the several figures in which like parts are designated by the same character of reference, and first adverting to Figure 1, the nozzle is formed as a venturi, comprising an upper tube $k$, and a lower tubular member $p$. The lower end of the tube $k$ is of less diameter than the upper end. The outlet of this tube is higher than the constant level N—N of the fuel as determined by the float chamber and the lower opening of this tube is below the fuel level and opens into a conduit $o$ supplied with fuel from the float chamber $c$ through the calibrated orifice $i$.

The lower tubular member $p$ has a conical upper end extending to a point substantially adjacent the lower end of the tube $k$ and axially disposed, the same cooperating with the tube $k$ to form an annular space providing an annular channel of communication between the upper tube $k$ and the conduit $o$, at which point atomization of the fuel and its admixture with the air coming in through the conduit $l$, takes place. A conduit $l$ is connected with the tubular part $p$, said conduit being bent in the form of a trap so as to hold a certain quantity of liquid fuel and having its other end open to atmosphere. The suction pipe of the engine is indicated at $m$ and leads to the engine past the throttle valve $g$. The conduit $l$ forms a reservoir into which liquid fuel is received and retained when the engine is not working, that is to say, when there is no suction on the venturi, the liquid level in the conduit $l$ will be the same as that in the float chamber and the venturi.

In consequence of this construction, while the conduit $l$, the conduit $o$ and the venturi are filled with liquid, air cannot pass through the conduit $l$ into the venturi, and consequently, the latter cannot function as a venturi. But as soon as the suction of the motor after starting, reaches a value greater than the value of the pressure of the head of liquid fuel $h$ in the conduit $l$ and upper tubular member $k$, the liquid contained both in the upper tubular member $k$ and in the conduit $l$ is sucked out entirely and the fuel in the conduit $o$ is partially sucked out until it reaches the level of the mouth of the lower tubular member $p$. The liquid thus sucked out forms a priming charge for the engine. At the moment when the liquid fuel in the several passages has been withdrawn by the engine suction until the mouth of the tubular member $p$ is exposed, a passage for air is opened through the conduit $l$ from atmosphere and immediately the venturi begins to work and the flow of air therethrough assists the suction of the engine to draw the fuel from the conduit $o$ through the annular passage at the lower end of the tube $k$.

Adverting now to that form of the invention shown in Figure 2, the float chamber $c$ is shown to one side of the motor suction tube $m$. The venturi in this instance consists of the upper tubular member $k$ and the lower tubular member $v$, the latter having a conical top $p$ so as to form in cooperation with the upper tubular member an annular passage $u$ to which liquid fuel normally flows from the float chamber by way of the calibrated orifice $i$, the chamber $g'$, and the passage $g^2$, the level of the liquid in the float chamber causing the liquid thus supplied to the carbureting element to rise in the upper tubular member $k$ of the venturi to the level indicated at N—N. The axial passage of the lower tubular member communicates by means of a lateral branch with an upwardly opening annular chamber having a part $w$ formed in said lower tubular member and a part $l$ formed between the outer wall of the upper member $k$ and a jacket $l'$ fitted at its lower end to the lower tubular member $v$ and open at its upper end to atmosphere. This jacket is analogous in function to the U-shaped conduit $l$ shown in Figure 1, in that it acts as a trap for holding liquid fuel during the inactive periods of the engine, which fuel is utilized as a priming charge at the beginning of the subsequent operation of the engine.

The carburetor operates as follows; when the engine is at rest liquid fuel flows by gravity from the float chamber through the orifice $i$ and passage $g'$ into and through the annular passage $u$ of the venturi, filling the axial chamber $n$ of the tube $k$ up to the level of the liquid in the float chamber, and likewise descending through the axial passage $p'$ in the conical part $p$ of the lower tubular member $v$, flowing through the lateral passage into the chamber $w$, $l$, up to the same level as that at which it stands within the venturi, the constricted portion of the latter being thus fully submerged at the time of starting of the motor. The liquid fuel also has free access to the chamber $w$, $l$, when the motor is not running through the passages $g'$, $t$ and $g^2$.

At starting of the engine, upon the initial opening of the throttle valve $g$, the suction in the suction pipe $m$ draws upon the mouth of the upper tubular member $k$, depleting the supply of liquid in said member as well as in the chamber $w$, $l$, the liquid in the said chamber discharging into the tubular member $k$ both by way of the passages $w$ and $p'$, and the passages $g^2$, $t$, and $g'$.

When the liquid in the tubular member $k$ has been depleted to the extent that the axial passage $p'$ of the venturi becomes opened to atmosphere by way of the chamber $w$, $l$, then the venturi begins to act as a venturi and draws in fuel by way of the annular passage $u$, which becomes atomized by entrainment with the air stream flowing in through the axial passage $p'$.

As will be noted from Figure 2 additional air ports $s$ are provided near the top of the upper tubular member $k$. Also the air port $t$ admits a small amount of air to the fuel passing from the chamber $g'$ upwardly to the annular passage $u$. These additional air ports, however, form no essential part of the present invention.

A sheath $l^2$ is shown fixed to the border of the upper tubular member $k$ and surrounding the open end of the chamber $w$, $l$, providing a circuitous path for the air before it enters into the upper end of said chamber.

Referring now to that form of the invention shown in Figure 3, the construction is in the main similar to that shown in Figure 2 except that the carbureting element is placed in the float chamber coaxial with the float and surrounded by the float, the carbureting element serving as a guide for the float. The only other material distinction between these two modifications is the fact that the sheath $l^2$ is omitted.

In both the constructions of Figures 2 and 3, the calibrated orifice $i$ is preferably formed in a separable bushing $v'$ threading into the lower tubular member $v$ of the venturi, by which means the orifice may at any time be replaced by one of a different size, if desired.

While I have in the above description endeavored to disclose what I believe to be preferred and practical forms of the invention, yet it is to be understood that the specific details are merely by way of example and not to be construed as limitations in their bearing upon the invention.

What I claim as my invention and desire to secure by Letters Patent of the United States is:—

In a carburetor including a float chamber and a motor suction pipe, a nozzle in the form of a venturi, comprising means providing walls defining upper and lower coaxial passages, the upper passage being trunconic with its smaller end adjacent the lower passage, and the wall defining the adjacent end of the lower passage being of less diameter than the wall surrounding the smaller end of the upper passage, the juxtaposed ends of the two passages being below the plane of the normal liquid level in said float chamber, said walls defining between them an annular passage, concentric to the common axis of said first mentioned passages, a connection between said annular passage and said float chamber, means forming a priming chamber open to atmosphere above the normal liquid level in said float chamber and extending to a point below said normal level, and a connection placing the lower portion of said priming chamber into communication with said lower passage, the said priming chamber, venturi, and said connection between the two, forming a receptacle for receiving from said float chamber, and retaining, a priming body of liquid fuel, up to the normal liquid level in said float chamber, when the motor suction pipe is inactive.

In witness whereof I have signed this specification.

GEORGES FÊLIX BRUT.